(12) United States Patent
Hashimoto

(10) Patent No.: US 9,225,868 B2
(45) Date of Patent: Dec. 29, 2015

(54) IMAGE FORMING APPARATUS CONFIGURED FOR FIXING CONTROL DURING INDEX TAB PRINTING

(71) Applicant: KYOCERA Document Solutions Inc., Osaka (JP)

(72) Inventor: Shinichi Hashimoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/494,897

(22) Filed: Sep. 24, 2014

(65) Prior Publication Data

US 2015/0092203 A1    Apr. 2, 2015

(30) Foreign Application Priority Data

Sep. 30, 2013    (JP) .................................. 2013-204462

(51) Int. Cl.
| H04N 1/00 | (2006.01) |
| H04N 1/047 | (2006.01) |
| G06K 15/02 | (2006.01) |
| G06K 15/14 | (2006.01) |
| G06K 15/16 | (2006.01) |
| G03G 15/20 | (2006.01) |
| G03G 15/00 | (2006.01) |

(52) U.S. Cl.
CPC ........... *H04N 1/047* (2013.01); *G03G 15/6594* (2013.01); *G06K 15/021* (2013.01); *G06K 15/14* (2013.01); *G06K 15/16* (2013.01); *H04N 1/0057* (2013.01); *G03G 15/2042* (2013.01); *G03G 15/502* (2013.01); *G03G 2215/00523* (2013.01); *G03G 2215/00556* (2013.01); *G03G 2215/00599* (2013.01); *G03G 2215/00751* (2013.01); *H04N 2201/0082* (2013.01); *H04N 2201/0094* (2013.01)

(58) Field of Classification Search
None
See application file for complete search history.

(56) References Cited

U.S. PATENT DOCUMENTS

| 5,722,029 | A | * | 2/1998 | Tomidokoro et al. | G03G 15/5029 271/9.06 |
| 6,795,664 | B2 | * | 9/2004 | Sugimoto | 399/81 |
| 2003/0156851 | A1 | * | 8/2003 | Koh et al. | 399/45 |
| 2004/0083917 | A1 | * | 5/2004 | Kujirai | 101/484 |
| 2004/0263869 | A1 | * | 12/2004 | Kimura | 358/1.1 |
| 2008/0131182 | A1 | * | 6/2008 | Okajima | 400/76 |
| 2012/0154871 | A1 | * | 6/2012 | Oba | 358/1.18 |
| 2013/0026697 | A1 | * | 1/2013 | Harano | 271/9.01 |

FOREIGN PATENT DOCUMENTS

| JP | 2003280486 A | * | 10/2003 | ............. G03G 21/14 |
| JP | 2003-327339 A | | 11/2003 | |

* cited by examiner

*Primary Examiner* — Dung Tran
(74) *Attorney, Agent, or Firm* — Studebaker & Brackett PC

(57) ABSTRACT

An image forming apparatus settable for a custom size or a standard size includes an index sheet setting section, a print engine control processing section, and a print execution processing section. The index sheet setting section sets information pertaining to an index sheet having an index tab. Based on the information set by the index sheet setting section, the print engine control processing section switches between control in accordance with a setting for the custom size and control in accordance with a setting for the standard size. The print execution processing section executes control of printing on the index sheet.

10 Claims, 5 Drawing Sheets

IMAGE FORMING APPARATUS CONFIGURED FOR FIXING CONTROL DURING INDEX TAB PRINTING

INCORPORATION BY REFERENCE

The present application claims priority under U.S.C. §119 to Japanese Patent Application No. 2013-204462, filed Sep. 30, 2013. The contents of this application are incorporated herein by reference in their entirety.

BACKGROUND

The present disclosure relates to an image forming apparatus for performing printing on an index sheet having an index tab.

Present day technology enables an image forming apparatus, such as a printer, a multifunction printer, or a multifunction peripheral, to perform printing on an index sheet. The term index sheet refers to a sheet of a standard size, such as A4 or letter size, that has an index tab. The index tab protrudes from an edge of a standard size part of the index sheet. In other words, the index tab is located outside of an area corresponding to the standard size. Also, positioning and size of an index tab may differ for different index sheets. Therefore, when printing is to be performed on an index sheet, a user makes a print request by setting a printing sheet size as a custom size that is larger than a standard size. In such a situation, if the user makes the print request but forgets to load the index sheet in a sheet feed cassette, only an image of an original document is printed on a sheet of the standard size and an image is not printed on the index tab. In order to combat the issue described above, an image forming apparatus has been previously provided that automatically selects a sheet feed cassette in which index sheets have been loaded. For example, when an image forming apparatus executes a print job for printing an image on an index sheet, the image forming apparatus may select a sheet tray (sheet feed cassette) in which index sheets have been loaded that satisfy an indicated relationship between sheet orientation and index tab position. When an appropriate index sheet has not been loaded in the sheet tray, printing is suspended and is only executed once an appropriate index sheet is loaded. By suspending printing as described above when an appropriate index sheet has not been loaded, it is possible to prevent unnecessary printing from being performed.

SUMMARY

The present disclosure relates to an image forming apparatus settable for a standard size or a custom size. The image forming apparatus includes an index sheet setting section that sets information pertaining to an index sheet. The index sheet has an index tab. The image forming apparatus also includes a print engine control processing section and a print execution processing section. Based on the information set by the index sheet setting section, the print engine control processing section switches between control in accordance with a setting for the custom size and control in accordance with a setting for the standard size. The print execution processing section executes control of printing on the index sheet.

DETAILED DESCRIPTION

Figure 1:
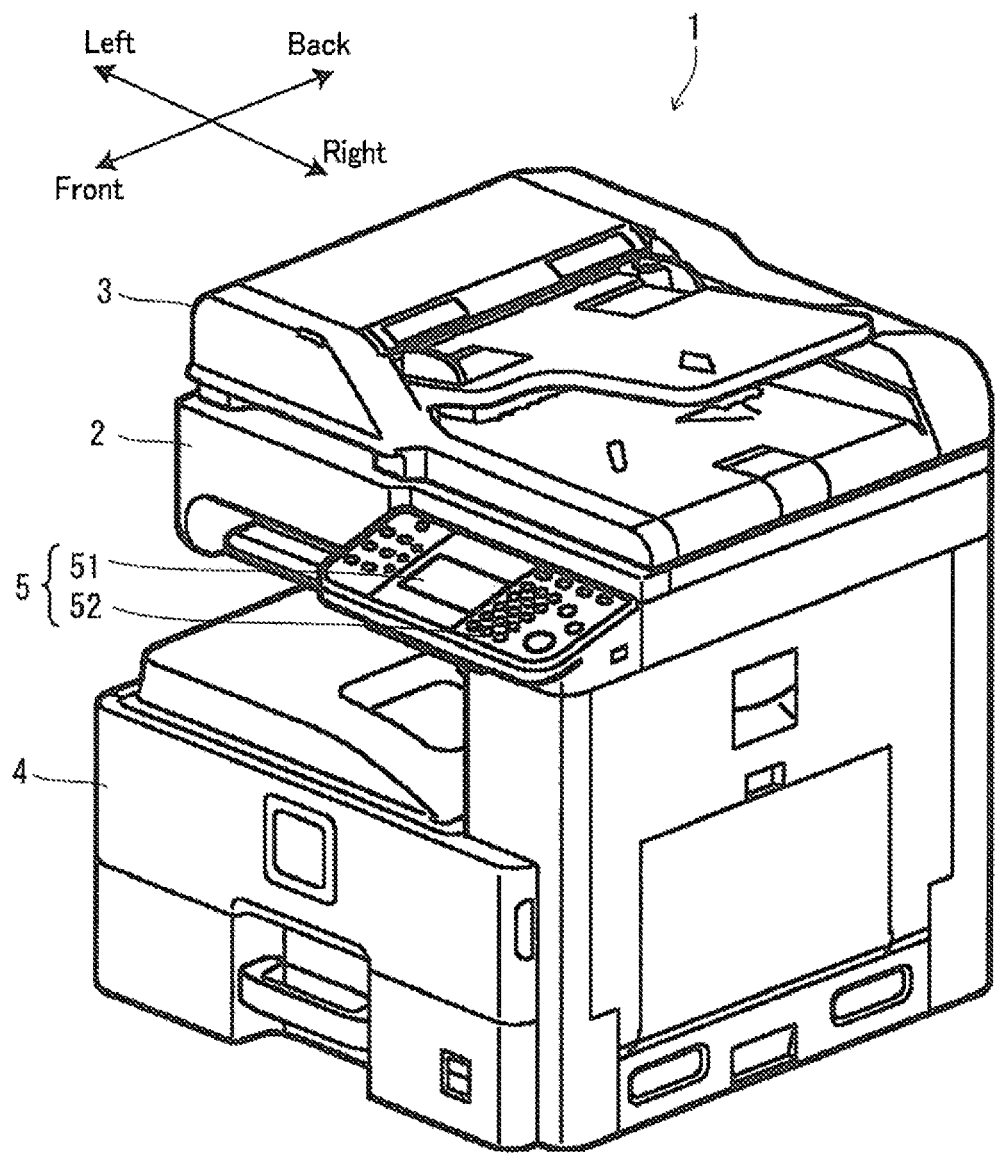
FIG. 1 is an external perspective view of an image forming apparatus relating to an embodiment.

The following explains an embodiment of the present disclosure with reference to the drawings. In an image forming apparatus 1 relating to the present embodiment, when a sheet P is an index sheet, the image forming apparatus 1 forms an image of an original document on a standard size part of the index sheet P. At the same time, the image forming apparatus 1 also forms an image on an index tab of the index sheet P. The image forming apparatus 1 may for example be a printer, a multifunction printer, or a multifunction peripheral. As illustrated in FIG. 1, the image forming apparatus 1 includes a document reading section 2, a document feed section 3, a main body 4, and an operation section 5. The document reading section 2 is located above the main body 4. The document feed section 3 is located above the document reading section 2.

The operation section 5 is located at a front side of the image forming apparatus 1. The operation section 5 includes a liquid-crystal display 51 and operation buttons 52. A user can make various settings with respect to the image forming apparatus 1 by inputting instructions through operation of the operation section 5. The user can also cause the image forming apparatus 1 to execute various functions thereof, such as image formation, by inputting instructions through operation of the operation section 5. The liquid-crystal display 51 displays a status of the image forming apparatus 1. The liquid-crystal display 51 also displays image formation condition and the number of copies to be printed. In the present embodiment, the liquid-crystal display 51 functions as a touch panel. The user can select functions such as 2-sided printing and black/white inversion through operation of the liquid-crystal display 51. The user can also adjust settings such as magnification or color density through operation of the liquid-crystal display 51. The operation buttons 52 included in the operation section 5 are for example a start button, a stop/clear button, a reset button, and a numeric keypad. The start button is for starting image formation. The stop/clear button is for stopping image formation. The reset button is for resetting various settings of the image forming apparatus 1 to default settings.

Figure 2:
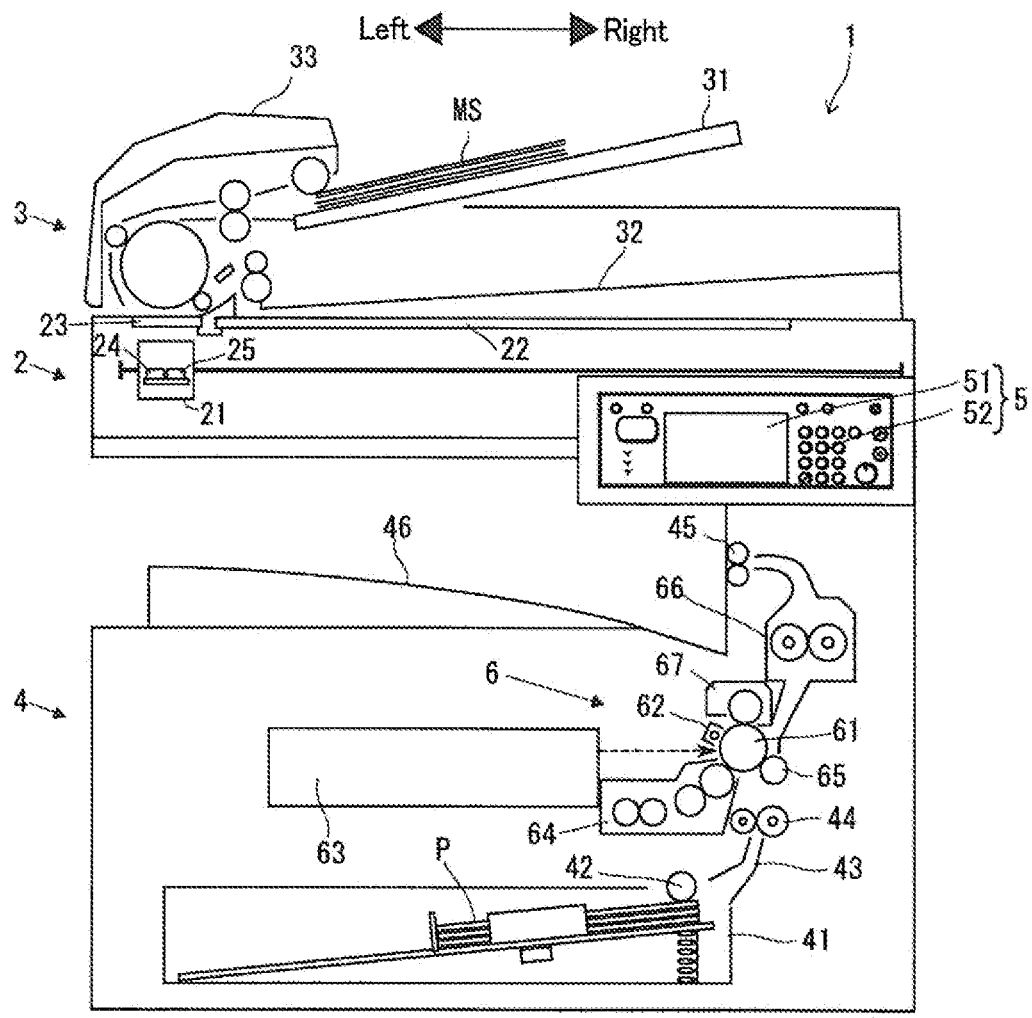
FIG. 2 is a cross-sectional overview diagram illustrating internal configuration of the image forming apparatus relating to the embodiment.

As illustrated in FIG. 2, the document reading section 2 includes a scanner 21 and platen glass 22. The document reading section 2 also includes a document reading slit 23. The scanner 21 includes a light source 24 and a light receiver 25. The light source 24 may for example be a light-emitting diode (LED). The light receiver 25 may for example be a charge coupled device (CCD) line sensor or a complementary metal oxide semiconductor (CMOS) line sensor. The scanner 21 is moveable in a conveyance direction of an original document MS, along which the original document MS is conveyed by the document feed section 3. The document reading slit 23 is orientated perpendicularly to the conveyance direction of the original document MS.

The document feed section 3 includes a document loading tray 31, a document ejection tray 32, and a document conveying mechanism 33. Sheets of the original document MS are loaded in the document loading tray 31 and are picked-up in order, one at a time, by the document conveying mechanism 33. The document conveying mechanism 33 conveys the original document MS to a position opposite the document reading slit 23 and subsequently ejects the original document MS onto the document ejection tray 32. The document reading section 2 and the document feed section 3 are connected to one another by a hinge mechanism at a back side of the image forming apparatus 1. Through the configuration described above, the document feed section 3 functions as a platen cover that covers or exposes an upper surface of the platen glass 22. When the user opens the document feed section 3 in an upward direction, the upper surface of the platen glass 22 is exposed, enabling the original document MS to be positioned on the platen glass 22.

When the user operates the operation buttons 52 of the operation section 5 to instruct document reading while an original document MS is not loaded in the document loading tray 31 or while the document feed section 3 (i.e., the platen cover) is open, an original document MS positioned on the platen glass 22 is read. At the above timing, the scanner 21 moves in a sub-scanning direction, perpendicular to a main scanning direction, from a sub-scanning direction reference line. In FIG. 2, the sub-scanning direction reference line is located at a left-hand edge of the platen glass 22. During the above, the scanner 21 moves in the sub-scanning direction while scanning the original document MS, set on the platen glass 22, in the main scanning direction. Through the scanning described above, the scanner 21 reads the original document MS, thereby acquiring image data. The image data that is acquired is output to a controller 7 (refer to FIG. 3) located in the main body 4.

On the other hand, when the user operates the operation buttons 52 of the operation section 5 to instruct document reading while an original document MS is loaded in the document loading tray 31, the original document MS is conveyed by the document feed section 3 and read. The original document MS is loaded in the document loading tray 31 such that a surface of the original document MS, on which an original document image which is to be read is located, is orientated in an upward direction. The original document MS, loaded in the document loading tray 31, is first conveyed leftward by the document feed section 3 and is subsequently conveyed rightward. Through the conveyance described above, the aforementioned surface of the original document MS is guided to the position opposite the document reading slit 23. At the above time, the scanner 21 is also located at a position opposite the document reading slit 23. The scanner 21 reads the original document MS, through the document reading slit 23, in synchronization with conveyance of the original document MS by the document feed section 3. Image data is acquired through the operation described above. The image data that is acquired is output to the controller 7 (refer to FIG. 3) located in the main body 4.

The main body 4 includes an image recorder 6. The main body 4 also includes a sheet feed section 41, a sheet feed roller 42, a sheet conveyance path 43, registration rollers 44, and ejection rollers 45. The sheet feed section 41 is a sheet feed cassette that stores a plurality of sheets P therein. The sheet feed roller 42 picks up the sheets P from the sheet feed section 41, one at a time, and feeds each of the sheets P into the sheet conveyance path 43. Once a sheet P has been fed into the sheet conveyance path 43 by the sheet feed roller 42, the registration rollers 44 convey the sheet P to the image recorder 6. The registration rollers 44 convey the sheet P, fed from the sheet feed section 41 (sheet feed cassette), such that a leading edge of the sheet P coincides with a leading edge of an image read from an original document. The image recorder 6 records the image on the sheet P which is conveyed thereto. The ejection rollers 45 eject the sheet P, having the image recorded thereon, into an ejection space 46. The ejection space 46 is a space present between the document reading section 2 and the main body 4. As described above, the sheet feed roller 42, the registration rollers 44, and the ejection rollers 45 collectively function as a conveying section that conveys the sheet P.

The image recorder 6 includes a photosensitive drum 61, a charging section 62, a light exposing section 63, an image forming section 64, a transferring section 65, a fixing section 66, and a cleaning section 67. The charging section 62 applies electrical charge to the photosensitive drum 61. The light exposing section 63 is an optical unit that for example includes a laser and a mirror. The light exposing section 63 outputs laser light based on the image data and irradiates the photosensitive drum 61, in a charged state, with the laser light. Through the above, an electrostatic latent image is formed at a surface of the photosensitive drum 61. The image forming section 64 is a developing unit that uses toner to develop the electrostatic latent image. The image forming section 64 forms a toner image on the photosensitive drum 61 based on the electrostatic latent image. The transferring section 65 transfers the toner image, formed on the photosensitive drum 61, onto the sheet P. The fixing section 66 heats the sheet P with the toner image transferred thereon, thereby fixing the toner image onto the sheet P. The cleaning section 67 removes residual toner from the photosensitive drum 61.

Figure 3:
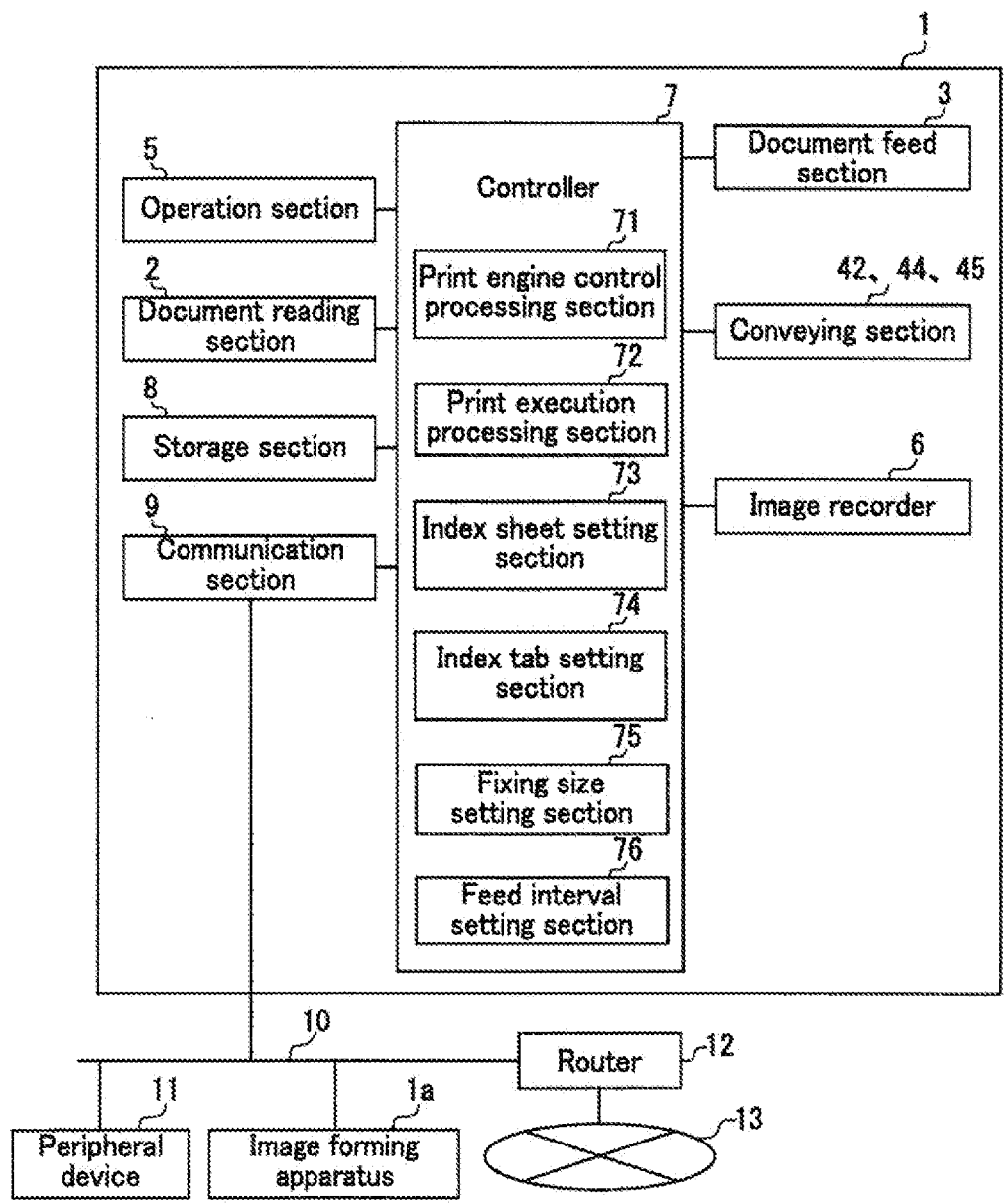
FIG. 3 is a block diagram illustrating functional configuration of the image forming apparatus relating to the embodiment.

FIG. 3 is a block diagram illustrating general configuration of the image forming apparatus 1. As illustrated in FIG. 3, the image forming apparatus 1 also includes the controller 7, a storage section 8, and a communication section 9. The controller 7 is connected to the document reading section 2, the document feed section 3, the conveying section (i.e., the sheet feed roller 42, the registration rollers 44, and the ejection rollers 45), the operation section 5, the image recorder 6, the storage section 8, and the communication section 9. The controller 7 controls operation of each of the aforementioned elements. The controller 7 includes a print engine control processing section 71, a print execution processing section 72, an index sheet setting section 73, an index tab setting section 74, a fixing size setting section 75, and a feed interval setting section 76.

The controller 7 is an information processing section such as a microcomputer which for example includes read only memory (ROM) and random access memory (RAM). A control program for operational control of the image forming apparatus 1 is stored in the ROM. The controller 7 reads the control program stored in the ROM and develops the control program in the RAM. Through the above, the controller 7 performs overall control of the image forming apparatus 1 in accordance with specific instruction information input from the operation section 5. The print engine control processing section 71 controls operation of a print engine included in the image forming apparatus 1. The print execution processing section 72 controls a print operation performed by the image forming apparatus 1. The fixing size setting section 75 sets a fixing size for the fixing section 66. The fixing size of the fixing section 66 refers to a range, measured in a direction perpendicular to a conveyance direction of the sheet P, over which the fixing section 66 performs a fixing process (i.e., a heating process). The feed interval setting section 76 sets an interval between times at which the sheet feed roller 42 picks up successive sheets P from the sheet feed section 41 and feeds the sheets P into the sheet conveyance path 43 (i.e., a time interval between successive feed operations).

The storage section 8 may for example function as a semiconductor memory or a hard disk drive (HDD). The storage section 8 stores the image data of the original document MS which is acquired by the scanner 21. The storage section 8 also stores various types of administration information and setting information.

The communication section 9 has a function of transmitting and receiving various types of data to and from another image forming apparatus 1a and a peripheral device 11 such as a personal computer (PC), via a network 10 such as a local area network (LAN). The communication section 9 is connectable to the Internet 13 via the network 10 and a router 12. Thus, the communication section 9 also has a function of transmitting and receiving various types of data to and from other communication devices connected to the Internet 13.

Figure 4A:
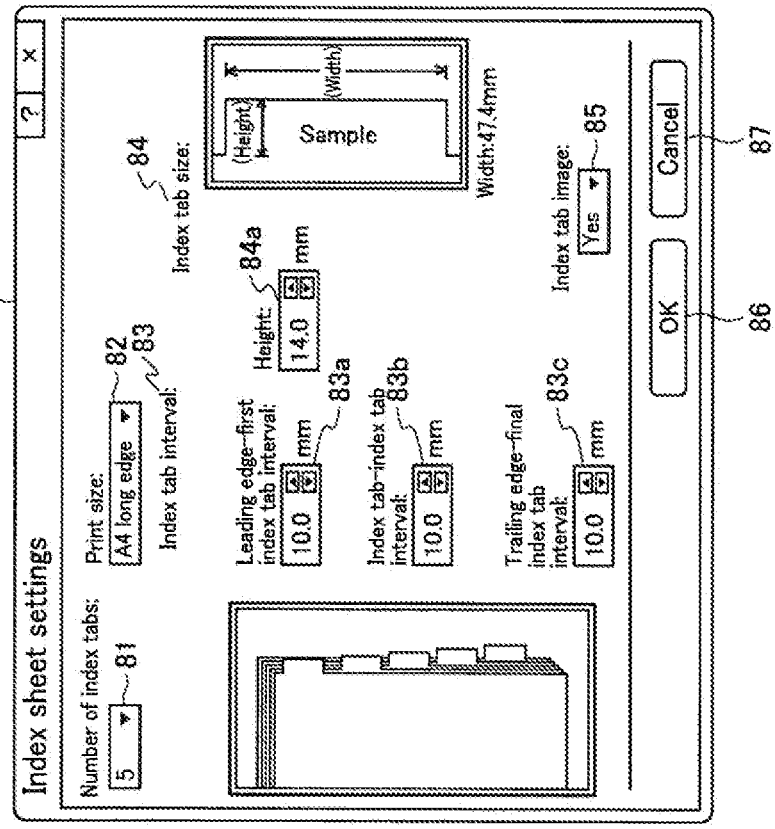
FIG. 4A illustrates an example of an index sheet setting screen relating to the embodiment.

The following explains an index sheet setting screen 80 with reference to FIG. 4A. The index sheet setting screen 80 is displayed on the liquid-crystal display 51 by the index sheet setting section 73. The index sheet setting screen 80 is for setting information pertaining to an index sheet P. Thus, when printing is to be performed on the index sheet P, the user can set information pertaining to the index sheet P through the index sheet setting screen 80.

The index sheet setting screen 80 illustrated in FIG. 4A includes various setting items such as a "Number of index tabs" column 81, a "Print size" column 82, "Index tab interval" columns 83, an "Index tab size" columns 84, and an "Index tab image" column 85. The index sheet setting screen 80 also includes an "OK" button 86 and a "Cancel" button 87.

The "Number of index tabs" column 81 is a setting column for setting the number of index tabs, which corresponds to the number of sheets P to be printed. The index sheet setting section 73 displays (i.e., sets) a value in the "Number of index tabs" column 81 in accordance with operation of the operation section 5 by the user. For example, when printing is to be performed successively on a plurality of index sheets P, the user can operate the operation section 5 to set a value of "2" or greater in the "Number of index tabs" column 81. On the other hand, when printing is to be performed on a single index sheet P, the user can operate the operation section 5 to set a value of "1" in the "Number of index tabs" column 81.

The "Print size" column 82 is a setting column for setting a size of a standard size part of the index sheet P (i.e., a part exclusive of the index tab) and for setting an edge of the index sheet P at which the index tab is located (i.e., either a long edge or a short edge). Note that the size of the standard size part of the index sheet P is referred to below as a "printing sheet size". The index sheet setting section 73 displays (sets) information in the "Print size" column 82 in accordance with operation of the operation section 5 by the user. For example, when the printing sheet size is A4 and the index tab is located at a long edge of the A4 sheet, the user can operate the operation section 5 to set "A4 long edge" in the "Print size" column 82.

The "Index tab interval" columns 83 are setting columns for setting index tab positioning. The "Index tab interval" columns 83 include a "Leading edge-first index tab interval" column 83a, an "Index tab-index tab interval" column 83b, and "Trailing edge-final index tab interval" column 83c. The index sheet setting section 73 displays (sets) values in the "Leading edge-first index tab interval" column 83a, the "Index tab-index tab interval" column 83b, and the "Trailing edge-final index tab interval" column 83c in accordance with operation of the operation section 5 by the user. Through the above, when a plurality of index sheets P that are printing targets each have an index tab at a different position relative to one another, the user can operate the operation section 5 to set a position of each of the index tabs. On the other hand, when only a single index sheet P is a printing target, the user can operate the operation section 5 to set a value of "0" in the "Index tab-index tab interval" column 83b.

The "Index tab size" columns 84 are one or more setting columns for setting the size of the index tab. The "Index tab size" columns 84 include a "Height" column 84a for setting a height of the index tab. The height of the index tab indicates a distance by which the index tab protrudes from the standard size part of the index sheet P. The index sheet setting section 73 displays (sets) a value in the "Height" column 84a in accordance with operation of the operation section 5 by the user. Through the above, the user can operate the operation section 5 to set the height of the index tab. Note that for the index sheet setting screen 80 illustrated in FIG. 4A, a width of the index tab is fixed at an initial setting of 47.4 mm, but in an alternative configuration a value for width of the index tab may also be settable (i.e., changeable).

The "Index tab image" column 85 is a setting column for setting whether or not an image is to be printed on the index tab. The index sheet setting section 73 displays (sets) information in the "Index tab image" column 85, indicating whether or not an image is to be printed on the index tab, in accordance with operation of the operation section 5 by the user. Through the above, the user can operate the operation section 5 to set whether or not an image is to be printed on the index tab.

The "OK" button 86 is for storing information in the storage section 8 such as setting values set in the setting columns (setting items) of the index sheet setting screen 80. Upon the user pressing the "OK" button 86, the index sheet setting section 73 stores, in the storage section 8, the information such as setting values set in the setting columns of the index sheet setting screen 80. The index sheet setting section 73 subsequently removes the index sheet setting screen 80 from the liquid-crystal display 51.

The "Cancel" button 87 is for cancelling information such as setting values set in the setting columns (setting items) of the index sheet setting screen 80. Upon the user pressing the "Cancel" button 87, the index sheet setting section 73 deletes the information such as setting values set in the setting columns of the index sheet setting screen 80 and displays previously set information such as setting values.

Figure 4B:
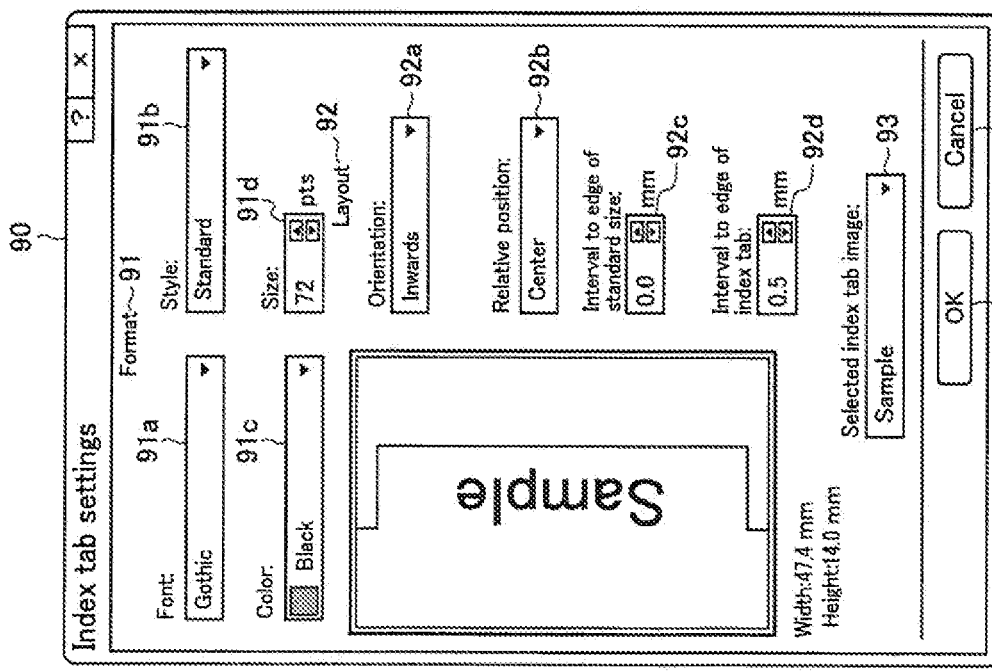
FIG. 4B illustrates an example of an index tab setting screen relating to the embodiment.

The following explains an index tab setting screen 90 with reference to FIG. 4B. The index tab setting screen 90 is displayed on the liquid-crystal display 51 by the index tab setting section 74. The index tab setting screen 90 is for setting information pertaining to an image which is to be printed on the index tab (herein also referred to as an index tab image). The index tab setting screen 90 illustrated in FIG. 4B includes various setting items such as "Format" columns 91, "Layout" columns 92, and a "Selected index tab image" column 93. The index tab setting screen 90 also includes an "OK" button 94 and a "Cancel" button 95.

The "Format" columns 91 are setting columns for setting format of one or more characters to be printed on the index tab. The "Format" columns 91 include a "Font" column 91a, a "Style" column 91b, a "Color" column 91c, and a "Size" column 91d. The "Font" column 91a is for setting a font of the characters. The "Style" column 91b is for setting a style of the characters. The "Color" column 91c is for setting a color of the characters. The "Size" column 91d is for setting a size of the characters. The index tab setting section 74 displays (sets) information in the "Font" column 91a, the "Style" column 91b, the "Color" column 91c, and the "Size" column 91d, in accordance with operation of the operation section 5 by the user. Through the above, the user can operate the operation section 5 to set the format of the characters to be printed on the index tab.

The "Layout" columns 92 are a plurality of setting columns for setting arrangement of a character or character string (i.e., the index tab image) to be printed on the index tab. The "Layout" columns 92 include an "Orientation" column 92*a*, a "Relative position" column 92*b*, an "Interval to edge of standard size" column 92*c*, and an "Interval to edge of index tab" column 92*d*. The index tab setting section 74 displays (sets) information in the "Orientation" column 92*a*, the "Relative position" column 92*b*, the "Interval to edge of standard size" column 92*c*, and the "Interval to edge of index tab" column 92*d*, in accordance with operation of the operation section 5 by the user. More specifically, the "Orientation" column 92*a* is for setting an orientation of the character or character string to be printed on the index tab. When the top of the character or character string is to be orientated toward a central part of the index sheet, the user operates the operation section 5 to set "Inward orientation". On the other hand, when the top of the character or character string is to be orientated in an opposite direction to the central part of the index sheet, the user operates the operation section 5 to set "Outward orientation". The "Relative position" column 92*b* is for setting a left-right position (i.e., a position in terms of a width direction of the index tab) of the character or character string (index tab image) to be printed on the index tab. When a left end of the character or character string is to be aligned with an edge of the index tab in terms of the width direction thereof, the user operates the operation section 5 to set "Left". On the other hand, when the character or character string is to be aligned with a center of the index tab in terms of the width direction, the user operates the operation section 5 to set "Center". Furthermore, when a right end of the character or character string is to be aligned with an edge of the index tab in terms of the width direction, the user operates the operation section 5 to set "Right". The "Interval to edge of standard size" column 92*c* and the "Interval to edge of index tab" column 92*d* are for setting up-down position of the character or character string (index tab image) to be printed on the index tab. More specifically, the "Interval to edge of standard size" column 92*c* is for setting an interval between the character or character string and the standard size part of the index sheet. The "Interval to edge of index tab" column 92*d* is for setting an interval between the character or character string and an outer edge of the index tab (i.e., an edge of the index tab in terms of the height direction thereof). The user operates the operation section 5 to set a value in either the "Interval to edge of standard size" column 92*c* or the "Interval to edge of index tab" column 92*d*.

The "Selected index tab image" column 93 is a setting column for setting an image (index tab image), such as one or more characters, to be printed on the index tab. The index tab setting section 74 displays (sets) information in the "Selected index tab image" column 93, indicating the image (e.g., a character or character string) to be printed on the index tab, in accordance with operation of the operation section 5 by the user. When printing is to be performed successively on a plurality of index sheets P, the user can set index tab images in the "Selected index tab image" column 93 in an order in which the index tab images are to be printed. Through the operation described above, the user can print a desired image on the index tab of each of the index sheets P.

The "OK" button 94 is for storing information in the storage section 8 such as setting values set in the setting columns (setting items) of the index tab setting screen 90. Upon the user pressing the "OK" button 94, the index tab setting section 74 stores, in the storage section 8, the information such as setting values set in the setting columns of the index tab setting screen 90. The index tab setting section 74 subsequently removes the index tab setting screen 90 from the liquid-crystal display 51.

The "Cancel" button 95 is for cancelling information such as setting values set in the setting columns (setting items) of the index tab setting screen 90. Upon the user pressing the "Cancel" button 95, the index tab setting section 74 deletes the information such as setting values set in the setting columns of the index tab setting screen 90 and displays previously set information such as setting values.

Figure 5:
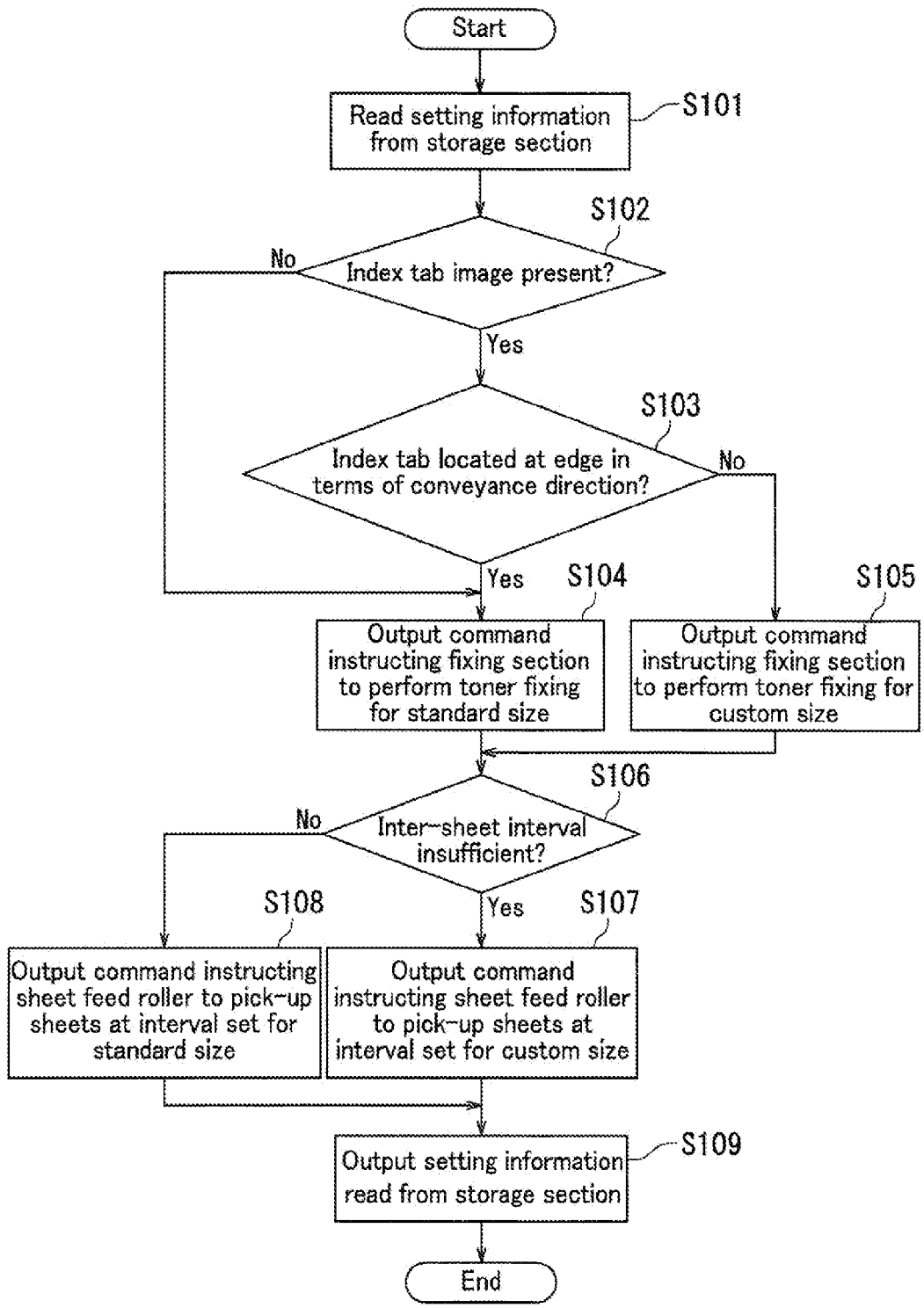
FIG. 5 is a flowchart illustrating an index sheet print process relating to the embodiment.

The following explains an index sheet print process performed by the image forming apparatus 1 with reference to FIG. 5. First, the index sheet setting section 73 displays the index sheet setting screen 80 on the touch panel of the liquid-crystal display 51 in accordance with operation of the operation section 5 by the user. Next, the index sheet setting section 73 sets each of the setting items in the index sheet setting screen 80 in accordance with operation of the operation section 5 by the user. In other words, the index sheet setting section 73 sets the "Number of index tabs" column 81, the "Print size" column 82, the "Index tab interval" columns 83, the "Index tab size" columns 84, and the "Index tab image" column 85. Upon the user subsequently pressing the "OK" button 86, the index sheet setting section 73 stores, in the storage section 8, information (setting information) such as setting values set for the setting items in the index sheet setting screen 80. Note that if the user has set "Yes" in the "Index tab image" column 85, the index tab setting section 74 displays the index tab setting screen 90 on the touch panel of the liquid-crystal display 51. Next, the index tab setting section 74 sets each of the setting items in the index tab setting screen 90 in accordance with operation of the operation section 5 by the user. In other words, the index tab setting section 74 sets the "Format" columns 91, the "Layout" columns 92, and the "Selected index tab image" column 93. Upon the user subsequently pressing the "OK" button 94, the index tab setting section 74 stores, in the storage section 8, information (setting information) such as setting values set for the setting items in the index tab setting screen 90. The user loads the original document MS in the document loading tray 31 and loads at least one index sheet P in the sheet feed section 41. Next, upon the user making an instruction, using the operation buttons 52, to start printing on the index sheet P, a print process is started on the index sheet P through the controller 7.

(Step S101)

The controller 7 first reads each of the types of setting information (e.g., setting values) stored in the storage section 8. The setting information read from the storage section 8 includes the information (setting information) such as setting values set for the setting items in the index sheet setting screen 80. Also, when "Yes" is set in the "Index tab image" column 85 in the index sheet setting screen 80, the setting information read from the storage section 8 further includes the information (setting information) such as setting values set for the setting items in the index tab setting screen 90.

(Step S102)

The controller 7 subsequently judges whether "Yes" is set in the "Index tab image" column 85 in the index sheet setting screen 80. When "Yes" is set in the "Index tab image" column 85 (Step S102: Yes), the process proceeds to Step S103. On the other hand, when "No" is set in the "Index tab image" column 85 (Step S102: No), the process proceeds to Step S104.

(Step S103)

Based on information set in the "Print size" column 82 in the index sheet setting screen 80 (i.e., information indicating an edge at which the index tab is located), the fixing size setting section 75 of the controller 7 judges whether the index tab is located at an edge of the index sheet P in terms of a conveyance direction of the index sheet P, or whether the index tab is located at an edge of the index sheet P in terms of a lateral direction perpendicular to the conveyance direction. When the index tab is located at the edge of the index sheet P in terms of the conveyance direction (Step S103: Yes), the process proceeds to Step S104. On the other hand, when the index tab is located at the edge of the index sheet P in terms of the lateral direction (Step S103: No), the process proceeds to Step S105.

(Step S104)

The fixing size setting section 75 sets a standard size as a fixing size of the fixing section 66. The aforementioned standard size is a printing sheet size that is set in the "Print size" column 82. The fixing size setting section 75 outputs a command to the print engine control processing section 71, instructing that the fixing section 66 performs toner fixing over a range corresponding to the printing sheet size (standard size).

(Step S105)

The fixing size setting section 75 sets a custom size (herein also referred to as a custom fixing size) as the fixing size of the fixing section 66. The fixing size setting section 75 determines the custom fixing size based on the printing sheet size set in the "Print size" column 82 and based on the value for index tab height set in the "Index tab size" columns 84. The fixing size setting section 75 outputs a command to the print engine control processing section 71, instructing that the fixing section 66 perform toner fixing over a range corresponding to the custom fixing size.

(Step S106)

Next, the feed interval setting section 76 of the controller 7 judges whether or not an interval along the sheet conveyance path 43 between successive index sheets P (i.e., an inter-sheet interval) is insufficient if the sheet feed roller 42 picks up the successive index sheets P from the sheet feed section 41 in accordance with the standard size (i.e., the printing sheet size). Herein, the inter-sheet interval being insufficient refers to a situation in which the interval along the sheet conveyance path 43 between the successive index sheets P either provides little leeway or causes interference between the successive index sheets P. The feed interval setting section 76 performs the aforementioned judgment based on the information set in the "Print size" column 82 and the "Index tab size" columns 84 in the index sheet setting screen 80. In other words, based on the information set in the "Print size" column 82 in the index sheet setting screen 80 (i.e., information indicating an edge at which the index tab is located), the feed interval setting section 76 of the controller 7 first judges whether the index tab is located at an edge of the index sheet P in terms of the conveyance direction thereof, or whether the index tab is located at an edge of the index sheet P in terms of the lateral direction perpendicular to the conveyance direction. When the index tab is located at the edge of the index sheet P in terms of the conveyance direction, the feed interval setting section 76 judges whether or not the inter-sheet interval is insufficient based on the value set for index tab height in the "Index tab size" columns 84. When the inter-sheet interval is insufficient (Step S106: Yes), the process proceeds to Step S107. On the other hand, when the inter-sheet interval is not insufficient (Step S106: No), the process proceeds to Step S108. Furthermore, when the index tab is located at the edge of the index sheet P in terms of the lateral direction perpendicular to the conveyance direction, the feed interval setting section 76 judges that the inter-sheet interval is not insufficient (Step S106: No). Consequently, the process also proceeds to Step S108 in the situation described above.

(Step S107)

The feed interval setting section 76 sets a time interval between successive sheet feed operations, performed by the sheet feed roller 42, in accordance with a custom size (herein also referred to as a custom sheet feed size). Through the setting described above, the sheet feed roller 42 picks up successive index sheets P from the sheet feed section 41 in accordance with the custom sheet feed size. The feed interval setting section 76 determines the custom sheet feed size based on the printing sheet size set in the "Print size" column 82 and based on the value for index tab height set in the "Index tab size" columns 84. The feed interval setting section 76 subsequently outputs a command to the print engine control processing section 71, instructing that the sheet feed roller 42 pick up the index sheets P in accordance with the custom sheet feed size.

(Step S108)

The feed interval setting section 76 sets a time interval between successive sheet feed operations, performed by the sheet feed roller 42, in accordance with a standard size. Through the setting described above, the sheet feed roller 42 picks up successive index sheets P from the sheet feed section 41 in accordance with the standard size. The aforementioned standard size is the printing sheet size set in the for the "Print size" column 82. The feed interval setting section 76 subsequently outputs a command to the print engine control processing section 71, instructing that the sheet feed roller 42 pick up the index sheets P in accordance with the printing sheet size (i.e., the standard size).

(Step S109)

Next, the controller 7 starts-up the print execution processing section 72 and outputs, to the print execution processing section 72, the setting information read from the storage section 8 in Step S101. Under control of the print execution processing section 72, the image forming apparatus 1 reads the original document MS and prints the image of the original document MS on the standard size part of the index sheet P. Also, when "Yes" is set in the "Index tab image" column 85, the image forming apparatus 1 prints the index tab image on the index tab of the index sheet P under the control of the print execution processing section 72, in addition to printing the image of the original document MS on the standard sized part of the index sheet P.

According to the present embodiment, when printing is to be performed on an index sheet, the user can set information pertaining to the index sheet as appropriate using the index sheet setting screen 80. Furthermore, the user can also set information pertaining to the index tab as appropriate using the index tab setting screen 90. Also, toner is fixed over a wider range corresponding to a custom size (custom fixing size) only when "Yes" is set in the "Index tab image" column 85 and the index tab is located at an edge of the index sheet P in terms of the lateral direction perpendicular to the conveyance direction. In contrast, toner is fixed over a normal range corresponding to a standard size when "No" is set in the "Index tab image" column 85. Controlling the print engine as described above can restrict occurrence of insufficient toner fixing. Furthermore, when an interval (inter-sheet interval) along the sheet conveyance path 43 between successive index sheets P is insufficient, sheet feeding is performed using a wider interval (time interval between successive sheet feed operations) which is set in accordance with a custom size (custom sheet feed size). In contrast, when the inter-sheet interval is not insufficient, sheet feeding is performed using a normal interval (time interval between successive sheet feed operations) which is set in accordance with a standard size. Controlling the print engine as described above can prevent sheet jamming while also increasing printing speed.

Note that although in the present embodiment, the user sets each of the setting items through operations with respect to the index sheet setting screen 80 and the index tab setting screen 90 displayed on the liquid-crystal display 51, the present disclosure is not limited to such a configuration. For example, alternatively a print driver for the image forming apparatus 1 may be loaded in the peripheral device 11 illustrated in FIG. 3, which is for example a PC, and each of the setting items in the index sheet setting screen 80 and the index tab setting screen 90 may be set using the peripheral device 11. In such a configuration, information set for each of the setting items is transmitted from the peripheral device 11 to the image forming apparatus 1 in accompaniment to a print request for printing on an index sheet.

Also note that although the sheet feed section 41 of the image forming apparatus 1 illustrated in FIG. 2 only includes one sheet feed cassette, such a configuration is merely an example. The image forming apparatus 1 may alternatively include a plurality of sheet feed cassettes. Also, the sheet feed cassettes may each store sheets of a different size.

Furthermore, the print engine control processing section 71 controls the fixing section 66 to perform toner fixing for either a custom size (custom fixing size) or a standard size. The print engine control processing section 71 also controls the sheet feed roller 42 to pick up successive index sheets P at an interval (time interval between successive sheet feed operations) set in accordance with either a custom size (custom sheet feed size) or a standard size. However, control targets of the print engine control processing section 71 are not limited to the control targets described above. The print engine control processing section 71 can control any element that is switchable between a custom size and a standard size by switching between control in accordance with a setting for the custom size and control in accordance with a setting for the standard size with respect to operation of the element.

In the present embodiment, the fixing size setting section 75 sets a custom fixing size as the fixing size of the fixing section 66 when judging that the index tab is located at an edge of the index sheet P in terms of the lateral direction perpendicular to the conveyance direction of the index sheet P and that an image is to be printed on the index tab, but the present disclosure is not limited to such a configuration. Alternatively, the fixing size setting section 75 may set a custom fixing size as the fixing size of the fixing section 66 when judging that the index tab is located at an edge of the index sheet P in the lateral direction perpendicular to the conveyance direction of the index sheet P.

Also, in the present embodiment, the feed interval setting section 76 sets the time interval between successive sheet feed operations performed by the sheet feed roller 42 as an interval in accordance with the custom sheet feed size, when judging that the index tab is located at an edge of the index sheet P in terms of the conveyance direction thereof and that the interval (inter-sheet interval) along the sheet conveyance path 43 between successive index sheets P is insufficient. However, the present disclosure is not limited to such a configuration. Alternatively, the feed interval setting section 76 may set the time interval between successive sheet feed operations performed by the sheet feed roller 42 as an interval in accordance with a custom sheet feed size, when judging that the index tab is located at an edge of the index sheet in terms of the conveyance direction thereof.

The image forming apparatus 1 described above enables the user to set information pertaining to an index sheet and information pertaining to an index tab as appropriate when printing is to be performed on the index sheet. An effect of the above is that insufficient toner fixing and sheet jamming can be restricted. In particular, printing can be performed without any specific restrictions even when executing a process in which sheet jamming has a high tendency to occur, such as a 2-sided print process on an index sheet.

The present disclosure is explained above through a specific embodiment thereof, but the embodiment described above is merely provided as an illustrative example of the present disclosure and of course does not in any way limit the present disclosure.

What is claimed is:

1. An image forming apparatus settable for a custom size or a standard size, comprising:
    an index sheet setting section configured to set information pertaining to an index sheet having an index tab;
    a print engine control processing section configured to, based on the information set by the index sheet setting section, switch between control in accordance with a setting for the custom size and control in accordance with a setting for the standard size; and
    a print execution processing section configured to execute control of printing on the index sheet;
    a fixing section configured to fix toner; and
    a fixing size setting section configured to, based on the information set by the index sheet setting section, set the custom size as a fixing size of the fixing section when judging that the index tab is located at an edge of the index sheet in terms of a lateral direction perpendicular to a conveyance direction of the index sheet.

2. An image forming apparatus according to claim 1, further comprising:
    a sheet feed roller configured to perform a feed operation on the index sheet; and
    a feed interval setting section configured to, based on the information set by the index sheet setting section, set a feed interval between successive feed operations by the sheet feed roller in accordance with the custom size when judging that the index tab is located at an edge of the index sheet in terms of the conveyance direction thereof.

3. An image forming apparatus according to claim 1, further comprising
    an index tab setting section configured to set information pertaining to the index tab.

4. An image forming apparatus settable for a custom size or a standard size, comprising:
    an index sheet setting section configured to set information pertaining to an index sheet having an index tab;
    a print engine control processing section configured to, based on the information set by the index sheet setting section, switch between control in accordance with a setting for the custom size and control in accordance with a setting for the standard size;
    a print execution processing section configured to execute control of printing on the index sheet;
    a fixing section configured to fix toner; and
    a fixing size setting section configured to, based on the information set by the index sheet setting section, set one of the standard size and the custom size as a fixing size of the fixing section, the fixing size setting section setting the custom size as the fixing size when judging that an image is to be formed on the index tab and that the index tab is located at an edge of the index sheet in terms of a lateral direction perpendicular to a conveyance direction of the index sheet, and setting the standard size as the fixing size when judging that an image is not to be formed on the index tab or that the index tab is located at an edge of the index sheet in terms of the conveyance direction.

5. An image forming apparatus according to claim 4, wherein
the custom size is determined by size of the index tab, and
the standard size is determined by size of a standard size part of the index sheet.

6. An image forming apparatus according to claim 4, further comprising:
a sheet feed roller configured to perform a feed operation on the index sheet; and
a feed interval setting section configured to, based on the information set by the index sheet setting section, set a feed interval between successive feed operations by the sheet feed roller in accordance with the custom size when judging that the index tab is located at the edge of the index sheet in terms of the conveyance direction thereof.

7. An image forming apparatus according to claim 4, further comprising
an index tab setting section configured to set information pertaining to the index tab.

8. An image forming apparatus settable for a custom size or a standard size, comprising:
an index sheet setting section configured to set information pertaining to an index sheet having an index tab;
a print engine control processing section configured to, based on the information set by the index sheet setting section, switch between control in accordance with a setting for the custom size and control in accordance with a setting for the standard size;
a print execution processing section configured to execute control of printing on the index sheet;
a sheet feed roller configured to perform a feed operation on the index sheet;
a sheet conveyance path into which the index sheet is fed by the sheet feed roller; and
a feed interval setting section configured to, based on the information set by the index sheet setting section, set a feed interval between successive feed operations by the sheet feed roller in accordance with one of the standard size and the custom size, the feed interval setting section setting the feed interval in accordance with the custom size when judging that the index tab is located at an edge of the index sheet in terms of a conveyance direction thereof and that an inter-sheet interval along the sheet conveyance path between successive index sheets is insufficient, and setting the feed interval in accordance with the standard size when judging that the index tab is located at an edge of the index sheet in terms of a lateral direction perpendicular to the conveyance direction or that the inter-sheet interval is not insufficient.

9. An image forming apparatus according to claim 8, wherein
the custom size is determined by size of the index tab, and
the standard size is determined by size of a standard size part of the index sheet.

10. An image forming apparatus according to claim 8, further comprising
an index tab setting section configured to set information pertaining to the index tab.

* * * * *